US012429813B2

(12) United States Patent
Ando et al.

(10) Patent No.: US 12,429,813 B2
(45) Date of Patent: Sep. 30, 2025

(54) IMAGE FORMING APPARATUS

(71) Applicant: KYOCERA Document Solutions Inc., Osaka (JP)

(72) Inventors: Satoshi Ando, Osaka (JP); Kei Wakayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 4 days.

(21) Appl. No.: 18/750,087

(22) Filed: Jun. 21, 2024

(65) Prior Publication Data

US 2025/0004420 A1 Jan. 2, 2025

(30) Foreign Application Priority Data

Jun. 28, 2023 (JP) ................................ 2023-105729

(51) Int. Cl.
*G03G 21/16* (2006.01)
*G03G 21/18* (2006.01)

(52) U.S. Cl.
CPC ..... *G03G 21/1853* (2013.01); *G03G 21/1619* (2013.01); *G03G 2221/1869* (2013.01)

(58) Field of Classification Search
CPC ........... G03G 21/1619; G03G 21/1839; G03G 21/1842; G03G 21/1867; G03G 21/1871; G03G 2221/1869; G03G 2221/1884
See application file for complete search history.

(56) References Cited

U.S. PATENT DOCUMENTS

| | | | | |
|---|---|---|---|---|
| 2008/0170875 A1* | 7/2008 | Kim | G03G 15/0896 | 399/90 |
| 2010/0239306 A1* | 9/2010 | Souda | G03G 21/1652 | 399/107 |
| 2014/0147158 A1* | 5/2014 | Fujinaka | G03G 21/1661 | 399/167 |
| 2017/0185003 A1 | 6/2017 | Ohkubo | G03G 15/161 | |
| 2018/0217527 A1 | 8/2018 | Ohkubo | G03G 15/161 | |
| 2022/0317620 A1* | 10/2022 | Suzuki | G03G 21/1647 | |

FOREIGN PATENT DOCUMENTS

JP 2017-120318 A 7/2017

* cited by examiner

*Primary Examiner* — Thomas S Giampaolo, II
(74) *Attorney, Agent, or Firm* — Stein IP, LLC

(57) ABSTRACT

An image forming apparatus includes: a main body frame; a process unit which is removably fitted in a first direction; a pressing member which presses the process unit in a second direction; and a restriction member which restricts the displacement of the process unit. The process unit includes a restriction plate which protrudes downward from the unit frame. The restriction member includes a pair of sandwiching surfaces which sandwich the restriction plate in the second direction. The process unit is fitted and is pressed by the pressing member such that the restriction plate abuts against the sandwiching surface to restrict the displacement of the process unit.

7 Claims, 17 Drawing Sheets

IMAGE FORMING APPARATUS

INCORPORATION BY REFERENCE

This application is based upon and claims the benefit of priority from the corresponding Japanese Patent Application No. 2023-105729 filed on Jun. 28, 2023, the entire contents of which are incorporated herein by reference.

BACKGROUND

The present disclosure relates to image forming apparatuses.

A conventional image forming apparatus includes a process unit which is removable with respect to the main body of the apparatus. The process unit includes a photosensitive drum and the like, and performs a process which develops an electrostatic latent image into a toner image.

SUMMARY

An image forming apparatus according to an aspect of the present disclosure includes a main body frame, a process unit, a pressing member and a restriction member. The main body frame includes a fitting region. The process unit is removably fitted into the fitting region in a first direction orthogonal to an up/down direction and performs a development process which develops an electrostatic latent image into a toner image. The pressing member presses the process unit fitted into the fitting region toward one side in a second direction horizontally orthogonal to the first direction. The restriction member is arranged in the fitting region to restrict the displacement of the process unit fitted into the fitting region in the second direction. The process unit includes a unit frame and a restriction plate. The restriction plate is arranged on the unit frame and protrudes downward from the unit frame with the second direction being the direction of thickness thereof. The restriction member includes a pair of sandwiching surfaces that sandwich the restriction plate in the second direction. The process unit is fitted into the fitting region, and the process unit is pressed by the pressing member to the one side in the second direction such that the restriction plate abuts against the sandwiching surface which is included in the pair of sandwiching surfaces and is located on the one side in the second direction to restrict the displacement of the process unit in the second direction.

DETAILED DESCRIPTION

An image forming apparatus 100 according to an embodiment of the present disclosure will be described below with reference to FIGS. 1 to 17. Although in the following description, a color laser printer of a tandem system is illustrated, the present disclosure is not limited to a printer and can be applied to a multifunctional peripheral which has a copying function and the like.

In the following description, a direction perpendicular to a flat floor surface on which the image forming apparatus 100 is installed is assumed to be an up/down direction. One horizontal direction orthogonal to the up/down direction is identified with a symbol D1, and is referred to as a first direction D1, and another horizontal direction orthogonal to the one horizontal direction is identified with a symbol D2, and is referred to as a second direction D2. The "horizontal" includes not only completely horizontal but also substantially horizontal.

For example, the first direction D1 is the forward/backward direction (depth direction) of the image forming apparatus 100. One side in the first direction D1 is a front side, and the other side opposite to the one side in the first direction D1 is a back side. The second direction D2 is the left/right direction (width direction) of the image forming apparatus 100. One side in the second direction D2 is a left side, and the other side opposite to the one side in the second direction D2 is a right side.

<Overall Configuration of Image Forming Apparatus>

Figure 1:
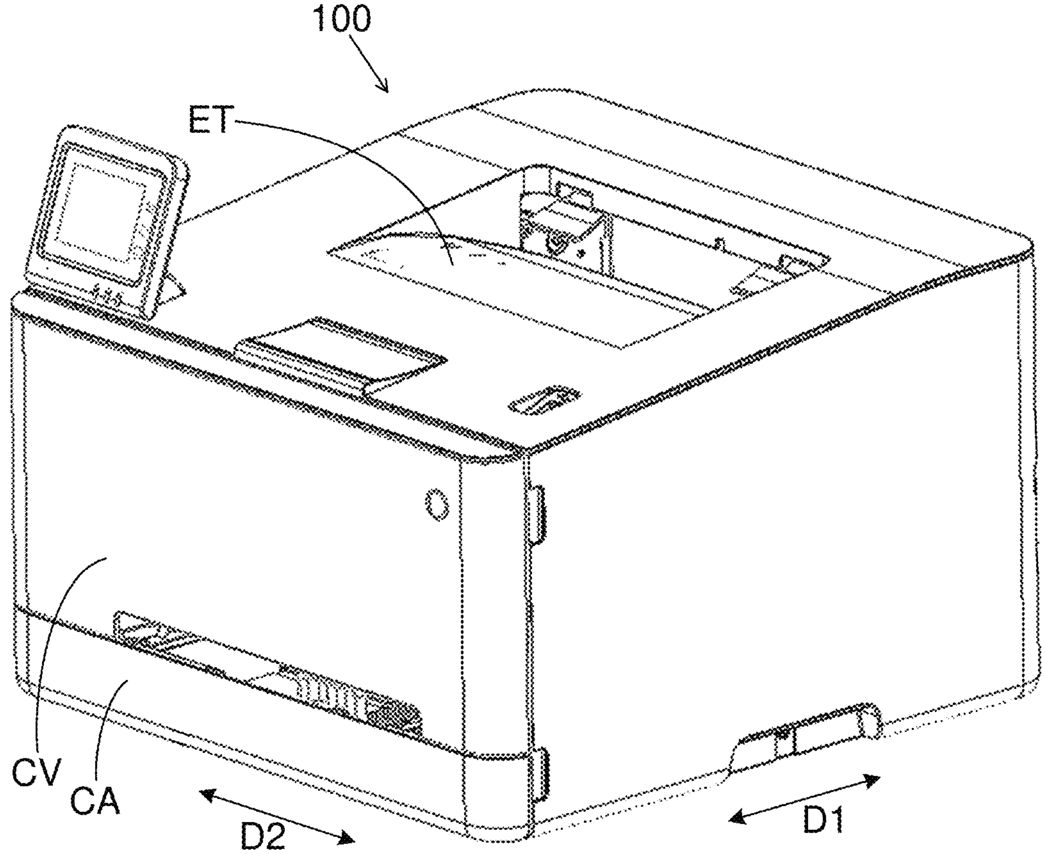
FIG. 1 is a perspective view of an image forming apparatus according to an embodiment.
Figure 2:
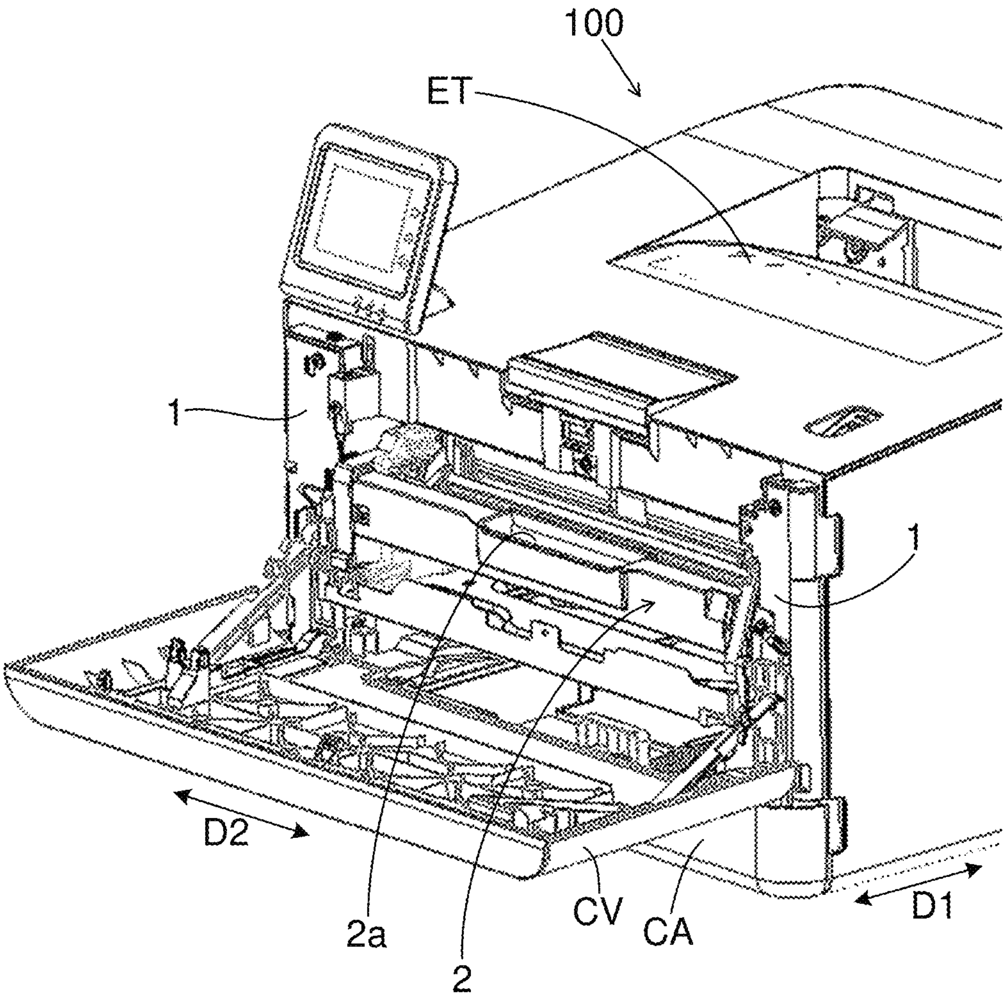
FIG. 2 is a perspective view showing a state where the front cover of the image forming apparatus shown in FIG. 1 is opened.

The image forming apparatus 100 of the present embodiment has an appearance as shown in FIGS. 1 and 2. The image forming apparatus 100 includes a main body frame 1.

The image forming apparatus 100 also includes a front cover CV. The main body frame 1 is covered with an exterior cover which includes the front cover CV (the symbols of the other covers are omitted). The main body frame 1 supports the exterior cover. The front cover CV is arranged on the one side in the first direction D1. The front cover CV covers the internal region of the image forming apparatus 100 from the one side in the first direction D1.

The main body frame 1 includes a fitting region 100A (see FIGS. 6 and 11) into which a process unit 2 to be described later is fitted. The internal region of the image forming apparatus 100 serves as the fitting region 100A. The main body frame 1 supports the front cover CV such that the front cover CV is rotatable around an axis extending in the second direction D2. The front cover CV uses end portions of its lower side as support points, and turns to swing end portions of its upper side. In other words, the front cover CV is supported such that the front cover CV can be opened and closed with respect to the main body frame 1. The front cover CV is opened, and thus the fitting region 100A is exposed to the one side in the first direction D1 (sec FIG. 2). The front cover CV is closed, and thus the fitting region 100A is covered from the one side in the first direction D1 (see FIG. 1).

Figure 3:
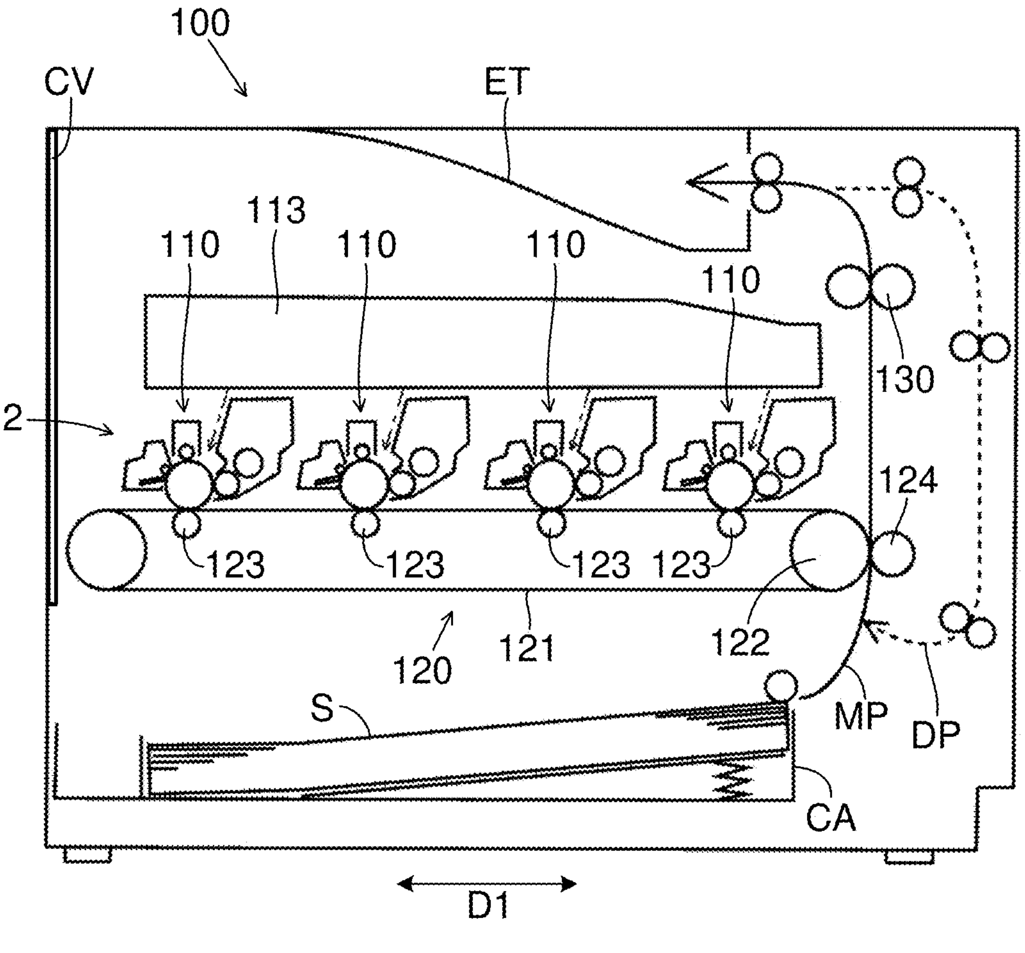
FIG. 3 is schematic view showing an internal configuration of the image forming apparatus according to the embodiment.

As shown in FIG. 3, the image forming apparatus 100 includes a main conveyance path MP. In FIG. 3, the main conveyance path MP is schematically indicated by a solid line with an arrow. A double-sided printing conveyance path DP which will be described later is schematically indicated by a dotted line with an arrow.

The image forming apparatus 100 includes a sheet cassette CA. The sheet cassette CA stores a sheet S which is used in a print job. The type of sheet S is not particularly limited.

In the print job, the image forming apparatus 100 supplies the sheet S in the sheet cassette CA to the main conveyance path MP, and coveys the sheet S along the main conveyance path MP. Then, the image forming apparatus 100 prints an image on the sheet S being conveyed. In other words, the image forming apparatus 100 transfers a toner image to the sheet S being conveyed.

The sheet cassette CA is fitted into a lower portion of the main body of the image forming apparatus 100. The sheet cassette CA is removable with respect to the main body (that is, the main body frame 1) of the image forming apparatus 100. The sheet cassette CA is pulled out from the main body of the apparatus to the one side in the first direction D1, and thus it is possible to remove the sheet cassette CA from the main body of the apparatus.

The image forming apparatus 100 includes image formation units 110 for four colors of cyan, magenta, yellow and black. The image formation units 110 form toner images corresponding to the colors. Attention will be focused on one of the image formation units 110, and the configuration of the image formation unit 110 will be described below. The image formation units 110 basically have the same configuration. Hence, the following description is assumed to be used for the description of the configurations of the other image formation units 110, and thus the description of the configurations of the other image formation units 110 is omitted.

Figure 4:
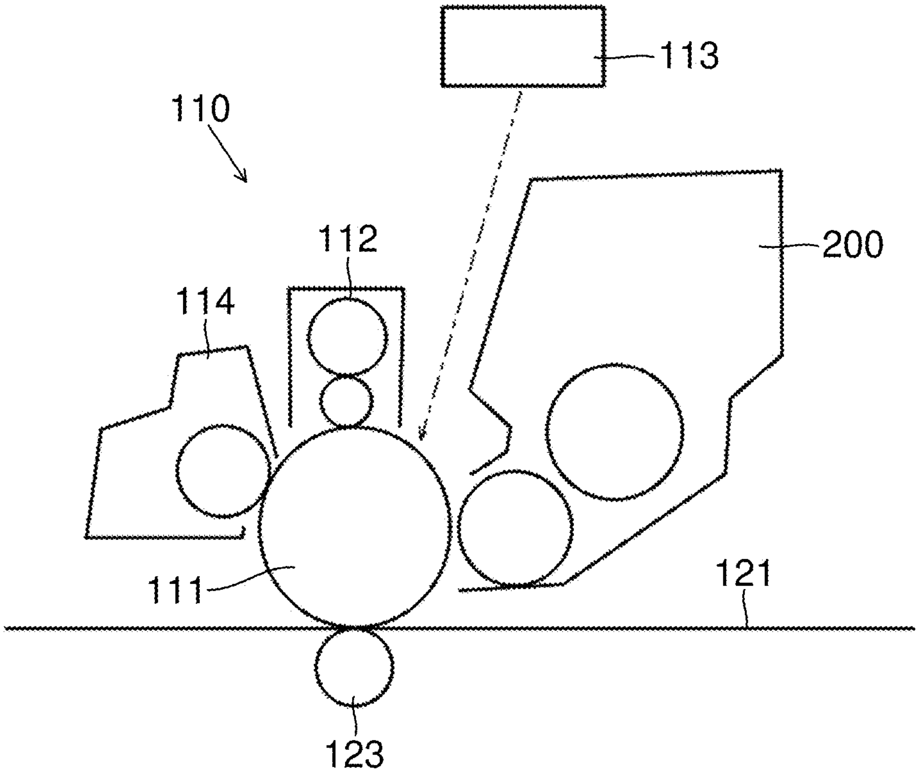
FIG. 4 is schematic view showing an image formation unit in the image forming apparatus according to the embodiment.

As shown in FIG. 4, the image formation unit 110 includes a development cartridge 200. The development cartridge 200 stores the toner of the corresponding color, and uses the toner to perform a development process. The image formation unit 110 includes a photosensitive drum 111 and a charging device 112. The image forming apparatus 100 includes one exposure unit 113 for the image formation units 110 of the four colors. The image formation unit 110 includes a cleaning device 114.

When the image formation unit 110 performs image formation, the photosensitive drum 111 is rotated. The charging device 112 charges the outer circumferential surface of the photosensitive drum 111. The exposure unit 113 exposes the outer circumferential surface of the photosensitive drum 111 to form an electrostatic latent image on the outer circumferential surface of the photosensitive drum 111. Then, the development cartridge 200 supplies, as the development process, the toner to the outer circumferential surface of the photosensitive drum 111, and performs a process for developing the electrostatic latent image into the toner image. The toner image on the outer circumferential surface of the photosensitive drum 111 is primarily transferred to an intermediate transfer belt 121 which will be described later. The cleaning device 114 removes the toner which is left on the outer circumferential surface of the photosensitive drum 111 without being transferred to the intermediate transfer belt 121.

With reference back to FIG. 3, the image forming apparatus 100 includes an intermediate transfer unit 120. The intermediate transfer unit 120 is arranged below the image formation units 110. The intermediate transfer unit 120 includes the intermediate transfer belt 121. The intermediate transfer belt 121 is an endless belt.

The intermediate transfer belt 121 is tensioned and is rotatably supported by a plurality of rollers including a drive roller 122 (the symbols of the other rollers are omitted). The intermediate transfer belt 121 is brought into contact with the outer circumferential surfaces of the photosensitive drums 111, and is rotated in this state. The drive roller 122 is rotated with power transmitted from a belt motor (not shown). The intermediate transfer belt 121 is rotated by following the rotation of the drive roller 122.

The intermediate transfer unit 120 includes primary transfer rollers 123. The primary transfer rollers 123 are respectively assigned to the colors of cyan, magenta, yellow and black. The primary transfer rollers 123 are arranged on the inner circumferential side of the intermediate transfer belt 121. The primary transfer rollers 123 are respectively arranged opposite the photosensitive drums 111 of the corresponding colors through the intermediate transfer belt 121.

The intermediate transfer unit 120 includes a secondary transfer roller 124. The secondary transfer roller 124 is pressed against the outer circumferential surface of the intermediate transfer belt 121 to form a transfer nip between the intermediate transfer belt 121 and itself. The main conveyance path MP passes through the transfer nip.

The image formation units 110 form the toner images of the corresponding colors. Then, the primary transfer rollers 123 primarily transfer the toner images to the outer circumferential surface of the intermediate transfer belt 121. In other words, the intermediate transfer belt 121 receives the transfer of the toner images from the process unit 2 which will be described later. The intermediate transfer belt 121 is rotated while carrying, on the outer circumferential surface, the toner images primarily transferred from the photosensitive drums 111. While the sheet S is being passed through the transfer nip, the sheet S makes contact with the outer circumferential surface of the intermediate transfer belt 121. The secondary transfer roller 124 forms a transfer electric field between the intermediate transfer belt 121 and itself to secondarily transfer the toner images to the sheet S which is being passed through the transfer nip.

The image forming apparatus 100 includes a fixing roller pair 130. The fixing roller pair 130 includes a heating roller and a pressure roller. The heating roller incorporates a heater. The pressure roller is pressed against the heating roller to form a fixing nip between the heating roller and itself. The fixing roller pair 130 is rotated while nipping the sheet S which is conveyed from the transfer nip. In other words, the fixing roller pair 130 heats and pressurizes the sheet S which is passed through the fixing nip. In this way, the fixing roller pair 130 fixes, to the sheet S, the toner images transferred to the sheet S. Thereafter, the sheet S is ejected to an ejection tray ET.

The image forming apparatus 100 can perform, as the print job, not only a single-sided print job for printing the toner images on only one side of the sheet S but also a double-sided print job for printing the toner images on both sides of the sheet S. In order to perform the double-sided print job, the image forming apparatus 100 includes the double-sided printing conveyance path DP.

The double-sided printing conveyance path DP is branched from the main conveyance path MP on the downstream side of the main conveyance path MP in a sheet conveyance direction with respect to the fixing nip. Then, the double-sided printing conveyance path DP merges into the main conveyance path MP on the upstream side of the main conveyance path MP in the sheet conveyance direction with respect to the transfer nip.

When a performance job is the single-sided print job, the sheet S is passed through the transfer nip only once, and transfer processing is performed once on the sheet S being passed through the transfer nip. Then, after the transfer processing is performed for the first time, the sheet S is ejected to the ejection tray ET without being processed.

When the performance job is the double-sided print job, since the transfer processing is performed once on each of the front and back sides of the sheet S, the sheet S is passed through the transfer nip twice. Specifically, when the sheet S is passed through the transfer nip for the first time, the transfer processing is performed on one side of the sheet S. After the transfer processing is performed for the first time, the sheet S is switched back before the back end of the sheet S is passed through the fixing nip and then the sheet S is completely ejected to the ejection tray ET. In this way, the sheet S is drawn into the double-sided printing conveyance path DP from its back end.

Thereafter, the sheet S is conveyed along the double-sided printing conveyance path DP. Then, the sheet S is returned to the main conveyance path MP from the upstream side of the transfer nip in the sheet conveyance direction. The sheet S which has been returned to the main conveyance path MP is passed though the transfer nip again. Here, the directions of the front and back sides of the sheet S are reversed with respect to those when the sheet S was previously passed through the transfer nip. In this way, when the sheet S is passed through the transfer nip for the second time, the transfer processing is performed on the other side opposite to the one side of the sheet S.

<Configuration of Process Unit>

The image forming apparatus 100 includes the process unit 2 which performs the development process for developing the electrostatic latent image into the toner image. Specifically, the four image formation units 110 which respectively correspond to the four colors of cyan, magenta, yellow and black are unitized to form the process unit 2. In other words, the process unit 2 includes at least four development cartridges 200 which respectively correspond to the four colors of cyan, magenta, yellow and black.

Figure 5:
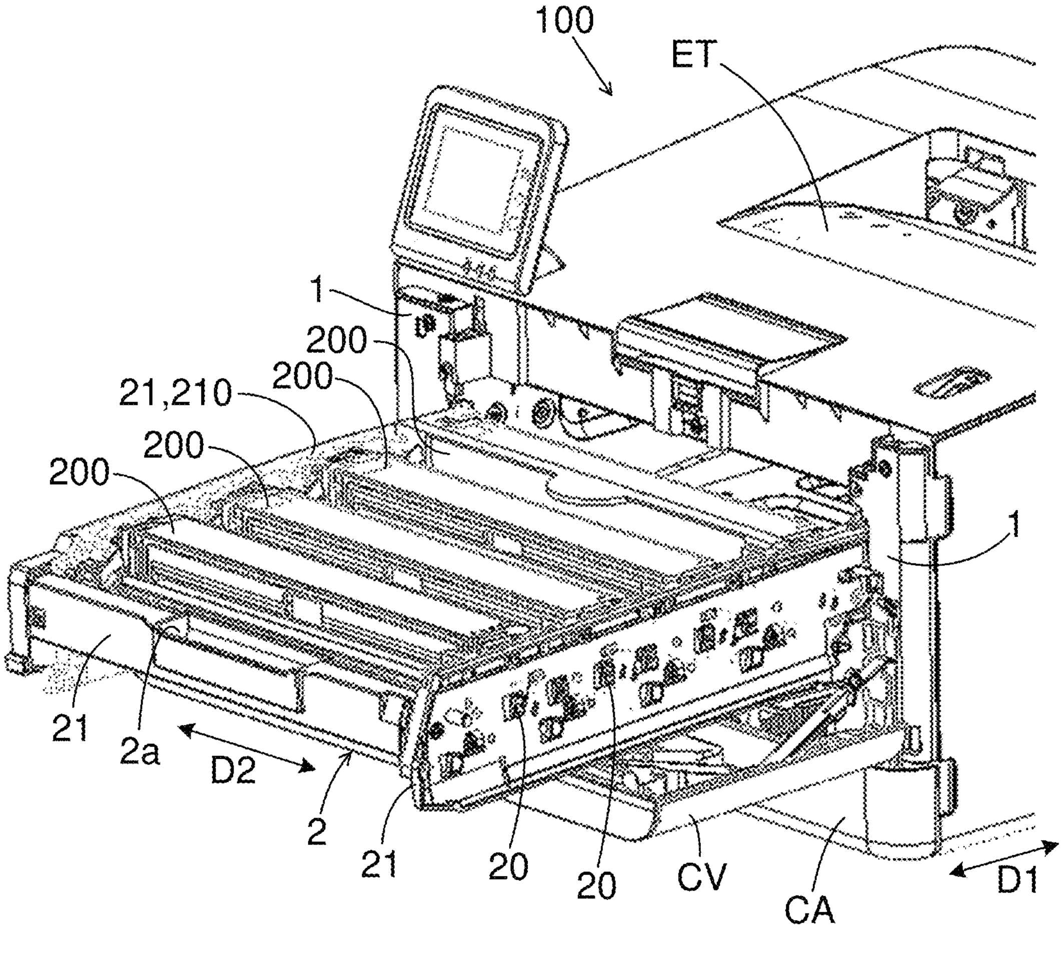
FIG. 5 is a perspective view showing a state where the process unit of the image forming apparatus shown in FIG. 1 is pulled out.

The process unit 2 includes a unit frame 21 (see FIG. 5). In the unit frame 21, the four image formation units 110 are arranged. In other words, in the unit frame 21, the four development cartridges 200 are arranged. The four image formation units 110 are arranged in the unit frame 21, and thus the four image formation units 110 are unitized.

The four image formation units 110 are arranged in the first direction D1. In other words, the four development cartridges 200 are arranged in the first direction D1. Hence, the unit frame 21 includes at least a pair of side plates which sandwich the four image formation units 110 in the second direction D2. A left side plate in the pair of side plates which is arranged on the one side (left side) in the second direction D2 corresponds to a "unit side plate", and in the following description, may be referred to as the unit side plate 210 by being identified with a symbol 210. The pair of side plates which include the unit side plate 210 of the unit frame 21 rotatably support rotating members included in the four image formation units 110.

The unit frame 21 is removably fitted into the main body frame 1 in the horizontal direction (specifically, the first direction D1). In this way, the process unit 2 is removable with respect to the main body of the image forming apparatus 100 (that is, the main body frame 1) in the horizontal direction. During maintenance of the image forming apparatus 100, the process unit 2 is removed from the main body of the apparatus. For example, when any one of the development cartridges 200 is replaced, the process unit 2 is removed from the main body of the apparatus.

In an operation of removing the process unit 2, the front cover CV is first opened in a state where the process unit 2 is fitted into the main body of the image forming apparatus 100 (that is, in a state where the unit frame 21 is fitted into the main body frame 1). The front cover CV is opened, and thus the image forming apparatus 100 is brought into a state shown in FIG. 2. In other words, the process unit 2 is exposed to the one side in the first direction D1. Then, the unit frame 21 is pulled out to the one side in the first direction D1 in this state. The process unit 2 is pulled out to the one side in the first direction D1 in the state where the unit frame 21 is fitted into the fitting region 100A so as to be removed from the main body frame 1.

For example, the unit frame 21 includes a grip portion **2*a* which is gripped by an operator who removes the process unit 2. A state where the process unit 2 is pulled out to the one side in the first direction D1 from the main body frame 1 is shown in FIG. 5**.

The process unit 2 is pulled out from the main body frame 1, and thus the four development cartridges 200 are exposed upward. The four development cartridges 200 are removably fitted into the unit frame 21 independently from each other. In this configuration, even when a certain development cartridge 200 is removed from the unit frame 21, the other development cartridges 200 remain fitted into the unit frame 21. In other words, in order to remove all the four development cartridges 200 from the unit frame 21, it is necessary to perform the removal operation on each of the four development cartridges 200. Constituent elements of the image formation units 110 such as the photosensitive drums 111 other than the development cartridges 200 are fixedly fitted to the unit frame 21, and thus the constituent elements cannot be removed from the unit frame 21.

The four development cartridges 200 are removable with respect to the unit frame 21 in the up/down direction. When the four development cartridges 200 are removed from the unit frame 21, each of the four development cartridges 200 is raised from the unit frame 21. Hence, the unit frame 21 does not cover the four development cartridges 200 from above.

<Contact Structure of Main Body of Apparatus and Process Unit>

The image forming apparatus 100 has a contact structure as shown in FIGS. 6 to 10. In this way, when the process unit 2 is fitted into the main body frame 1, the main body of the image forming apparatus 100 and the process unit 2 are electrically connected.

Figure 6:
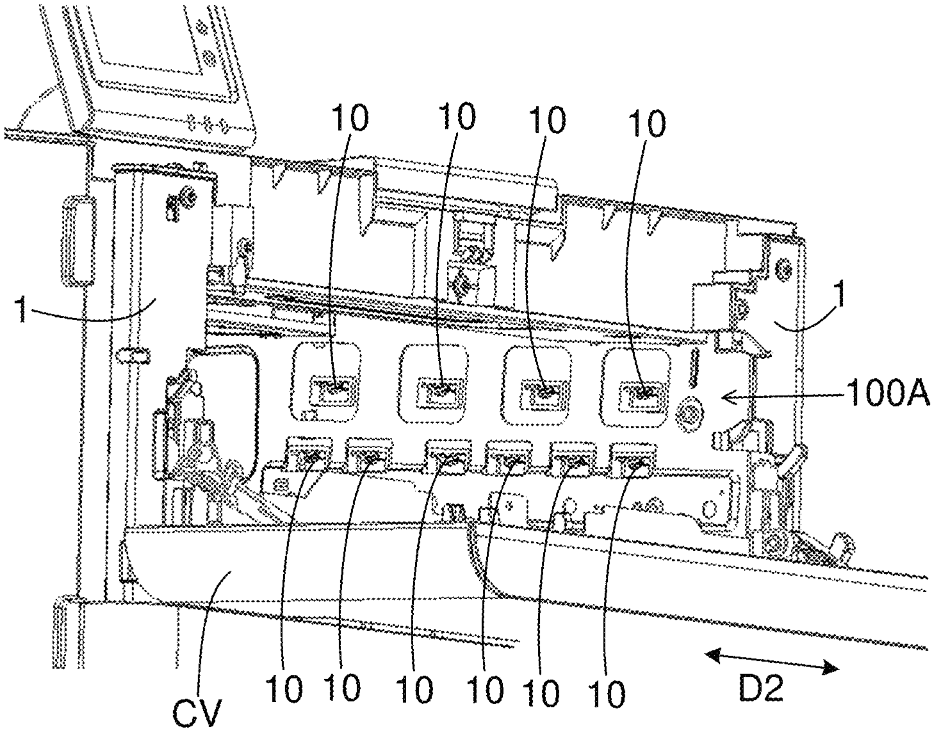
FIG. 6 is a perspective view showing main body side contacts in the image forming apparatus according to the embodiment.
Figure 7:
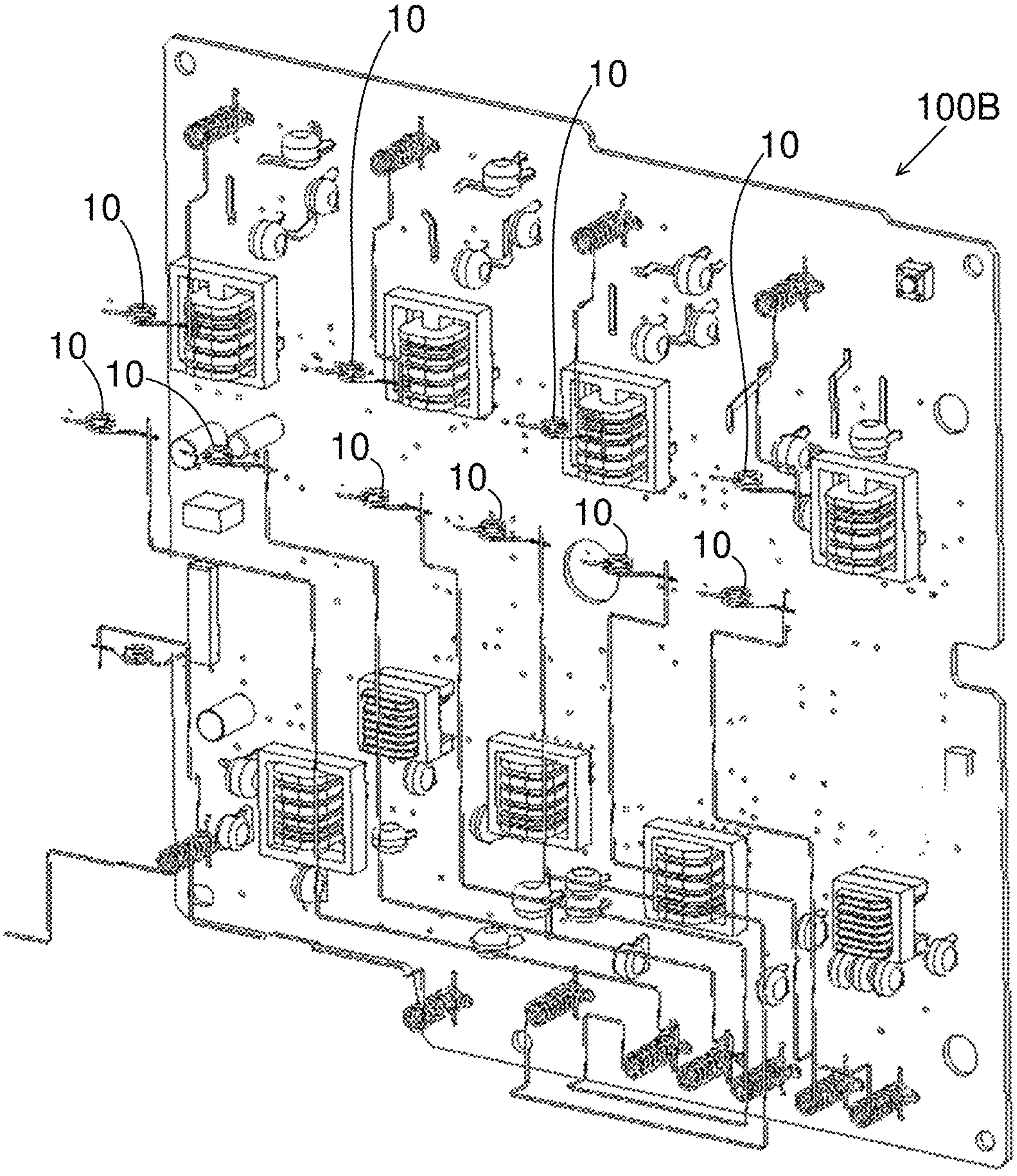
FIG. 7 is a perspective view showing a high voltage board in the image forming apparatus according to the embodiment.

Specifically, as shown in FIGS. 6 and 7, the image forming apparatus 100 includes main body side contacts 10. The main body side contacts 10 are connected to a high voltage board 100B. The high voltage board 100B is arranged in the main body frame 1. In this way, the main body side contacts 10 are arranged in the main body frame 1. FIG. 6 is a perspective view when the fitting region 100A is viewed from the front left of the image forming apparatus 100.

The high voltage board 100B is arranged on the right side of the main body frame 1. The main body side contacts 10 protrude from the right side of the main body frame 1 toward the fitting region 100A. In other words, the main body side contacts 10 protrude in the second direction D2. Furthermore, in other words, at least a part of the main body side contacts 10 are arranged in the fitting region 100A. In this way, the main body side contacts 10 can be brought into contact with the process unit 2 arranged in the fitting region 100A.

Figure 8:
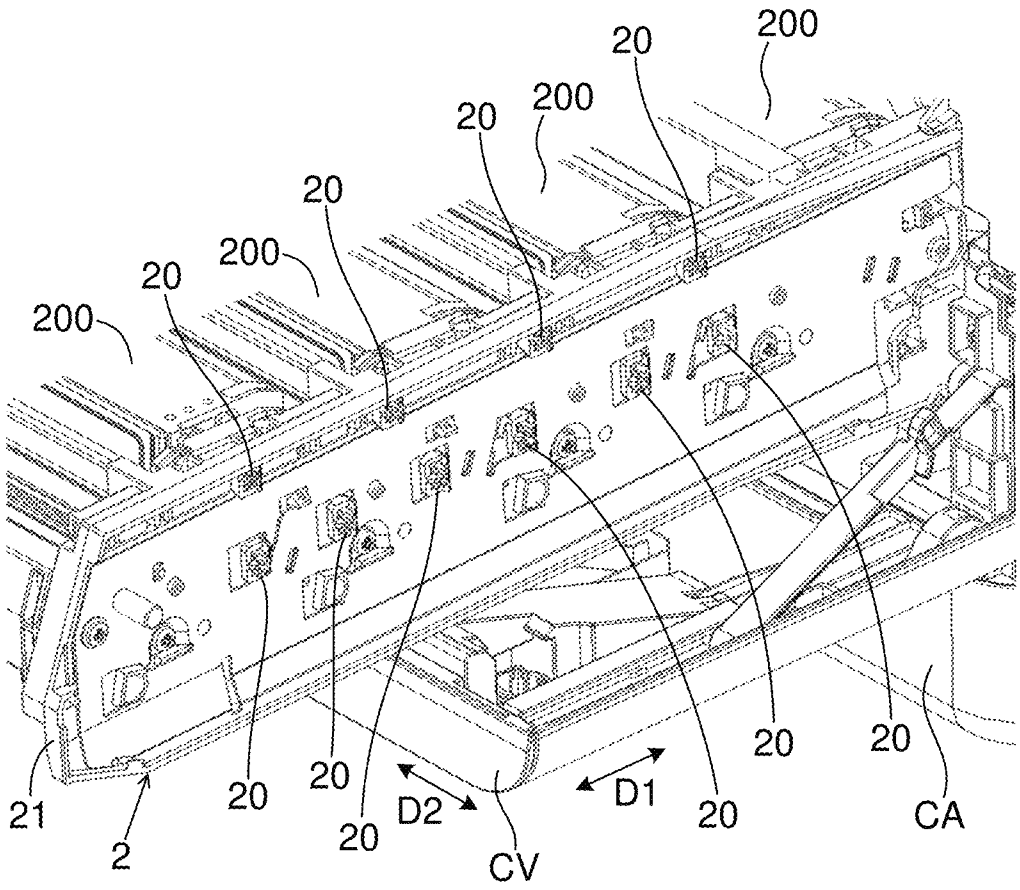
FIG. 8 is a perspective view showing unit side contacts in the image forming apparatus according to the embodiment.
Figure 9:
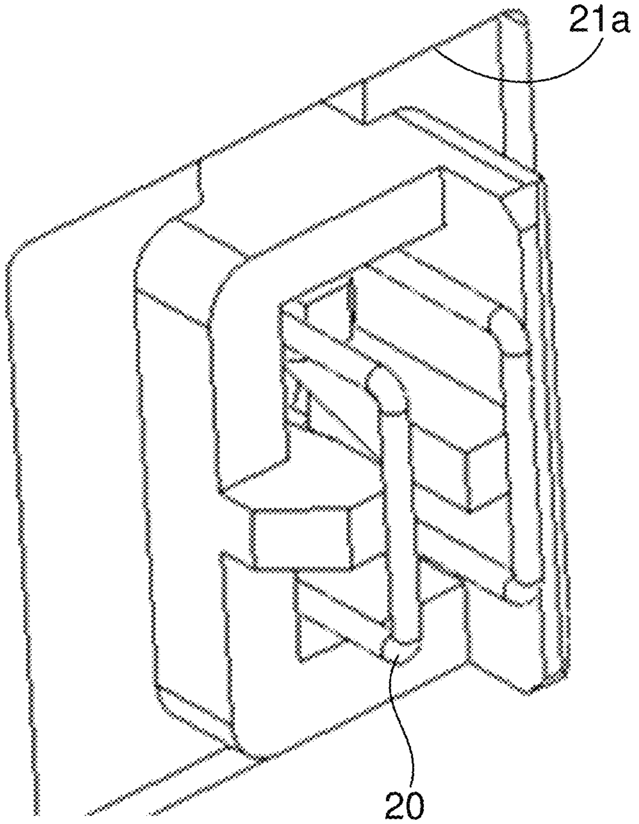
FIG. 9 is an enlarged view of the unit side contact in the image forming apparatus shown in FIG. 8.

As shown in FIGS. 8 and 9, the image forming apparatus 100 includes unit side contacts 20. The unit side contacts 20 are arranged in the process unit 2. In other words, the process unit 2 includes the unit side contacts 20. The unit side contacts 20 are supported by the unit frame 21. The unit side contacts 20 are exposed from through holes 21*a* formed in the unit frame 21. The unit side contacts 20 are connected to the constituent elements of the process unit 2 (such as the photosensitive drums 111 and the development cartridges 200).

A plurality of main body side contacts 10 are provided. The number of main body side contacts 10 is ten. A plurality of main body side contacts 10 are spaced in the first direction D1. The main body side contacts 10 are classified into an upper row and a lower row. The upper row includes four main body side contacts 10, and the lower row includes six main body side contacts 10.

The number of unit side contacts 20 is the same as the number of main body side contacts 10 (that is, a plurality of unit side contacts 20 are provided). The unit side contacts 20 are respectively assigned to the main body side contacts. When the number of main body side contacts 10 is ten, the number of unit side contacts 20 is ten. The unit side contacts 20 are respectively brought into contact with the main body side contacts 10 to which the unit side contacts 20 are assigned in a state where the process unit 2 is fitted into the fitting region 100A. In this way, the process unit 2 is electrically connected to the high voltage board 100B.

A detailed description will be given below with attention focused on a certain main body side contact 10. Here, the main body side contacts 10 have the same material and the same shape. Hence, the following description is assumed to be used for the description of the other main body side contacts 10, and thus the detailed description thereof is omitted.

Figure 10:
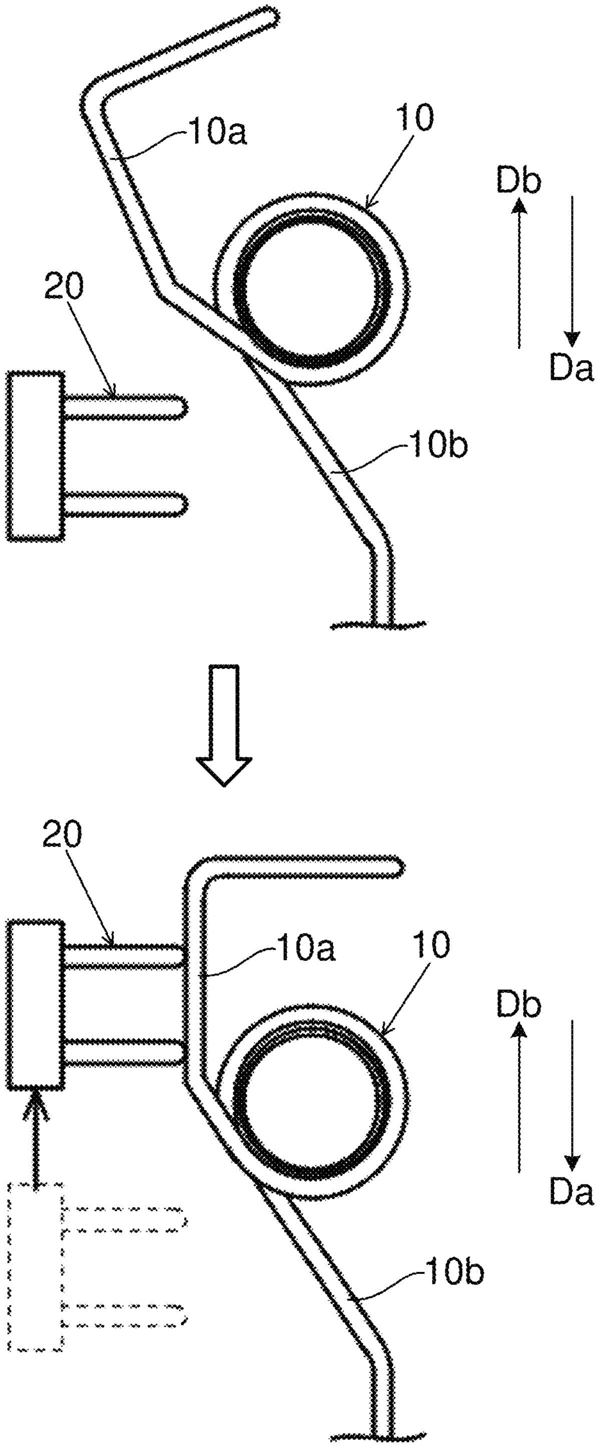
FIG. 10 is a schematic view showing the contact structure of the main body side contact and the unit side contact in the image forming apparatus according to the embodiment.

The main body side contact 10 is a torsion coil spring (see FIG. 10). Specifically, the main body side contact 10 includes a wound spring portion (the symbol of which is omitted) and a pair of arm portions 10*a* and 10*b* which extend tangentially from both ends of the wound spring portion. In the torsion coil spring serving as the main body side contact 10, the up/down direction is an axial direction. In the torsion coil spring serving as the main body side contact 10, the arm portion 10*a* on one side protrudes to the fitting region 100A, and can be brought into contact with the process unit 2 to be fitted into the fitting region 100A. In the torsion coil spring serving as the main body side contact 10, the arm portion 10*b* on the other side is fixed and connected to the high voltage board 100B.

The main body side contacts 10 press the process unit 2 fitted into the fitting region 100A toward the one side in the second direction D2 (that is, from the right side to the left side). The process unit 2 is fitted into the fitting region 100A, and thus the main body side contacts 10 generate a pressing force against the process unit 2. In this configuration, the main body side contacts 10 correspond to a “pressing member”.

The process unit 2 is fitted into the fitting region 100A, and thus a state shown in the upper diagram of FIG. 10 transitions to a state shown in the lower diagram of FIG. 10, with the result that the process unit 2 is pressed toward the one side in the second direction D2. The state shown in the upper diagram of FIG. 10 is a state immediately before the process unit 2 is fitted into the fitting region 100A, and the state shown in the lower diagram of FIG. 10 is a state where the process unit 2 has been fitted into the fitting region 100A.

In the state shown in the upper diagram of FIG. 10, the unit side contact 20 is not in contact with the main body side contact 10. In the state shown in the upper diagram of FIG. 10, the process unit 2 is further pressed into the fitting region 100A, and thus the unit side contact 20 is brought into contact with the arm portion 10*a* of the main body side contact 10. Here, the main body side contact 10 is deformed in the torsional direction of the torsion coil spring. Then, the process unit 2 is further pressed into the fitting region 100A. In this way, the state shown in the lower diagram of FIG. 10 is achieved, and thus the process unit 2 is pressed by the main body side contact 10 toward the one side in the second direction D2.

In FIG. 10, a direction in which the process unit 2 is pressed when the process unit 2 is fitted into the fitting region 100A is indicated by an arrow Db. In FIG. 10, a direction in which the process unit 2 is pulled out when the process unit 2 fitted into the fitting region 100A is removed from the main body frame 1 is indicated by an arrow Da. The same is true for the figures which are referenced in the following description. The pulling-out direction Da of the process unit 2 corresponds to a direction toward the one side in the first direction D1, and the pressing direction Db of the process unit 2 corresponds to a direction toward the other side opposite to the one side in the first direction D1.

<Guide for Fitting and Removing Process Unit>

Figure 11:
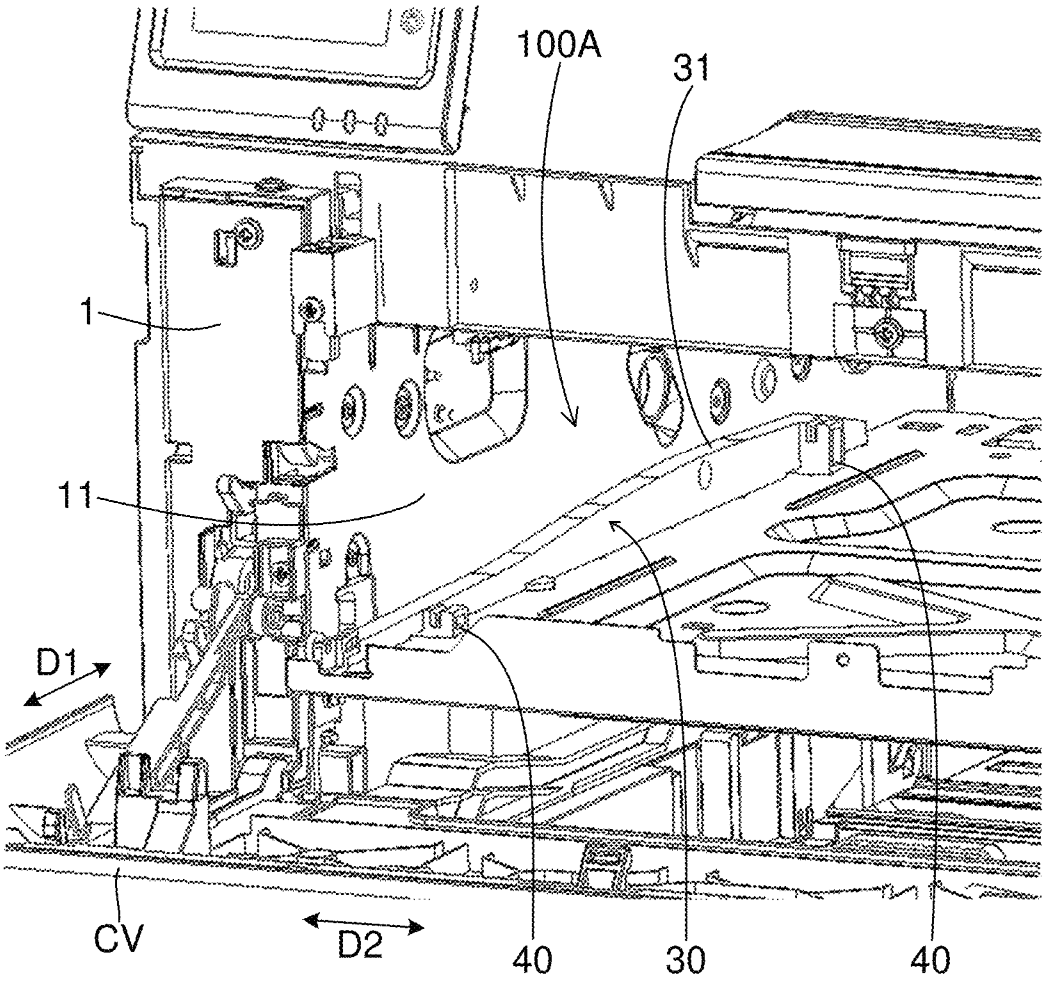
FIG. 11 is a perspective view showing a guide member in the image forming apparatus according to the embodiment.

As shown in FIG. 11, the image forming apparatus 100 includes a guide member 30. The guide member 30 is arranged on the one side of the fitting region 100A in the second direction D2 (the lower left of the fitting region 100A). The guide member 30 is supported by the main body frame 1 to be arranged in the fitting region 100A. In other words, the main body frame 1 includes the guide member 30 arranged in the fitting region 100A.

The guide member 30 includes a guide surface 31 which extends in the first direction D1. The upper surface of the guide member 30 serves as the guide surface 31. The upper surface of the guide member 30 (that is, the guide surface 31) is not flat. Although not shown in the figure, the same guide member as the guide member 30 is arranged on the other side of the fitting region 100A in the second direction D2 (the lower right of the fitting region 100A).

In the state where the process unit 2 is fitted into the fitting region 100A, the guide member 30 is arranged below the process unit 2. The guide member 30 guides the fitting and removal of the process unit 2 with respect to the fitting region 100A. The process unit 2 is fitted and removed with respect to the fitting region 100A by being moved along the guide surface 31 in the first direction D1.

Figure 12:
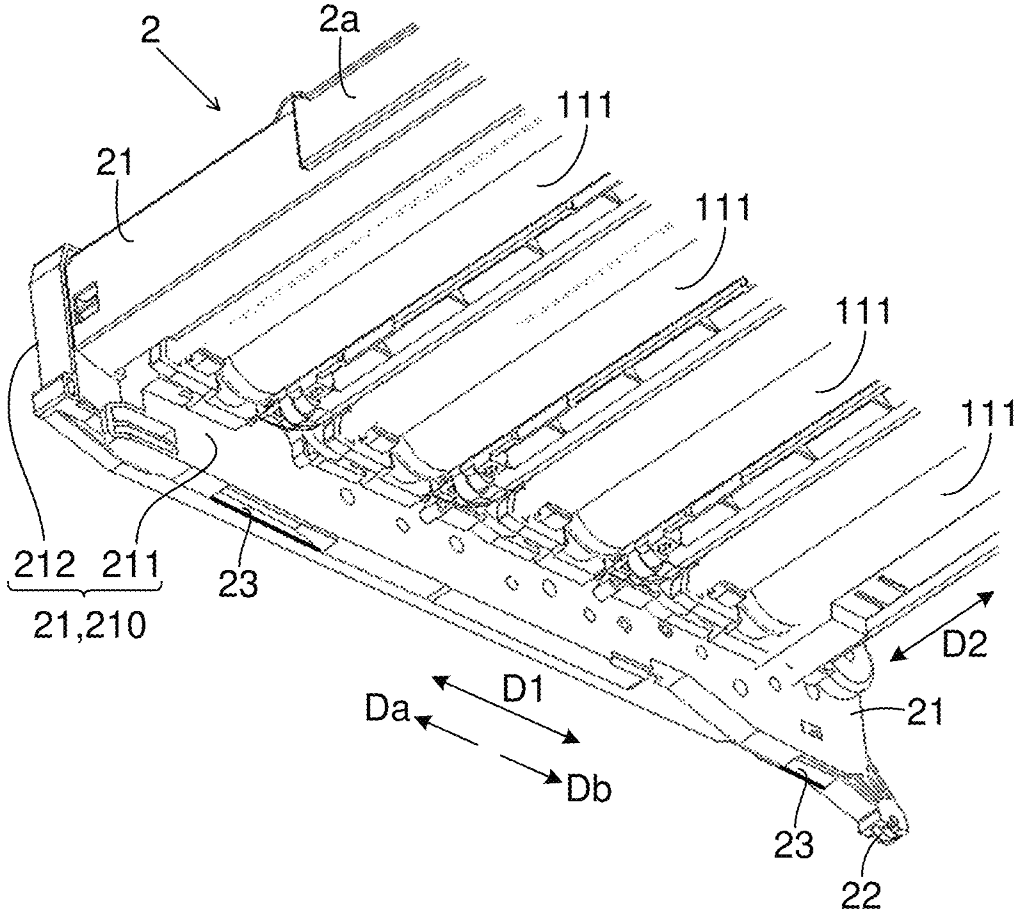
FIG. 12 is a perspective view showing a lower left portion of the process unit in the image forming apparatus according to the embodiment when the lower left portion is viewed from below.

Specifically, as shown in FIG. 12, the process unit 2 includes a roller 22 which is rotatable around an axis extending in the second direction D2. The roller 22 is rotatably supported by the unit frame 21. The roller 22 is arranged in the unit side plate 210 (that is, the left side plate). The roller 22 is arranged at an end portion of the unit side plate 210 on the other side in the first direction D1 (that is, the back side). In other words, the roller 22 is arranged at the end portion on the upstream side in the pulling-out direction of the process unit 2 when the process unit 2 is removed from the main body frame 1.

The roller 22 travels on the guide surface 31 when the process unit 2 is fitted into or removed from the fitting region 100A. When the process unit 2 is fitted into or removed from the fitting region 100A, the grip portion 2*a* of the unit frame 21 is slightly raised, and thus only the roller 22 is brought into contact with the guide surface 31. In this state, the process unit 2 is pressed in or pulled out, and thus the roller 22 is rotated, with the result that the process unit 2 is moved in the first direction D1. In this way, the process unit 2 is easily fitted and removed. In other words, the fitting and removal of the process unit 2 with respect to the fitting region 100A is guided. Although not shown in the figure, the roller may be arranged in the right side plate of the unit frame 21 or a member other than the roller may be arranged.

<Locating of Process Unit>

Figure 13:
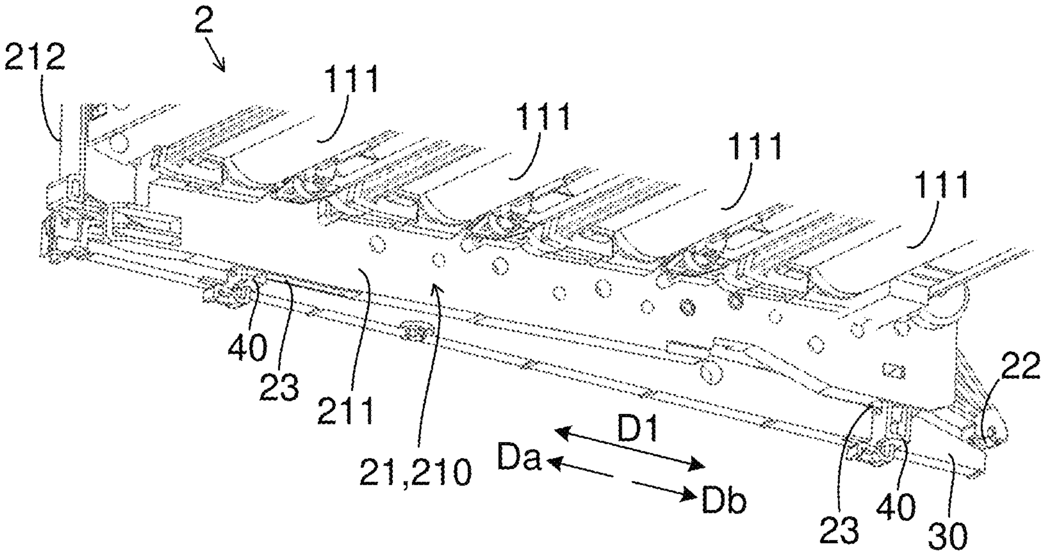
FIG. 13 is a perspective view showing a positional relationship between restriction members and the process unit in the image forming apparatus according to the embodiment.
Figure 14:
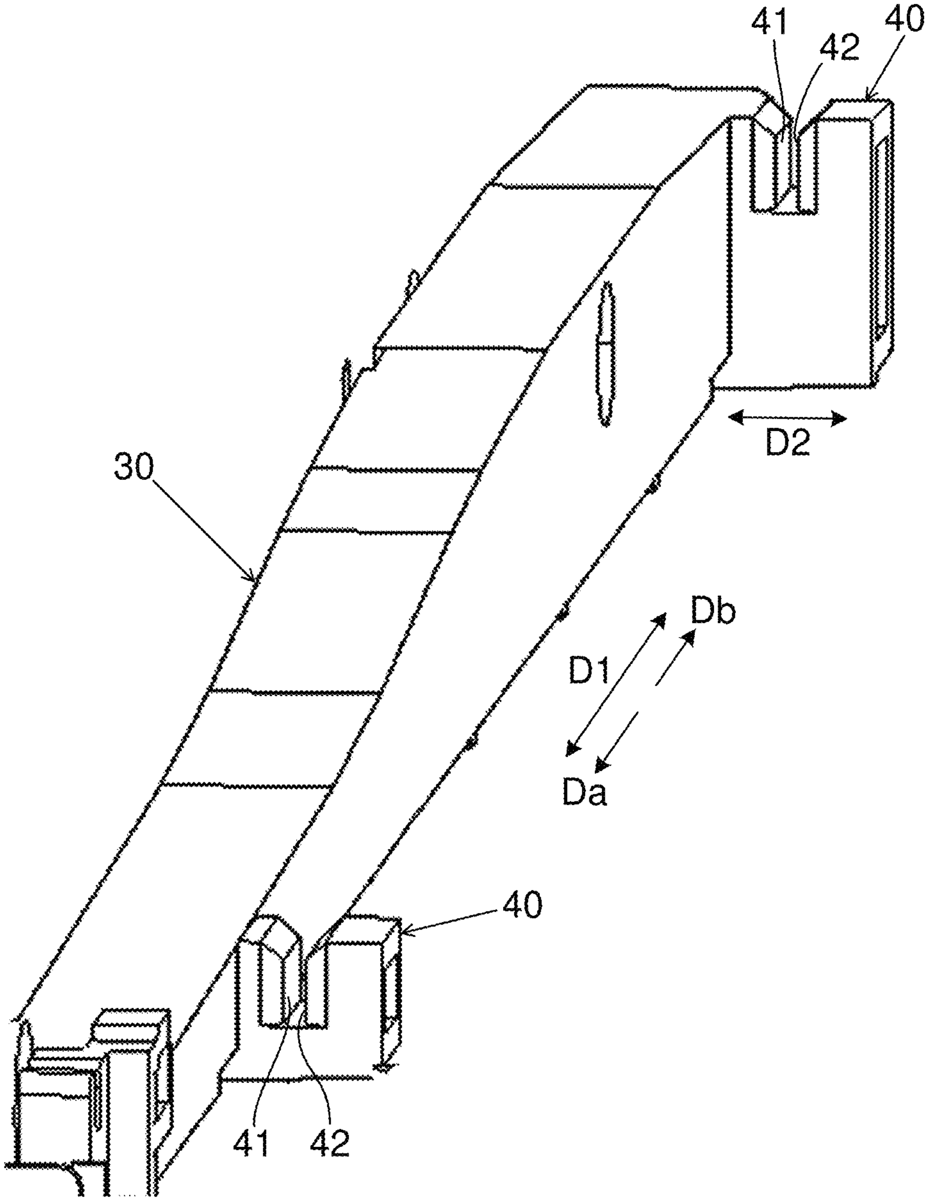
FIG. 14 is an enlarged perspective view of the restriction members in the image forming apparatus according to the embodiment.
Figure 15:
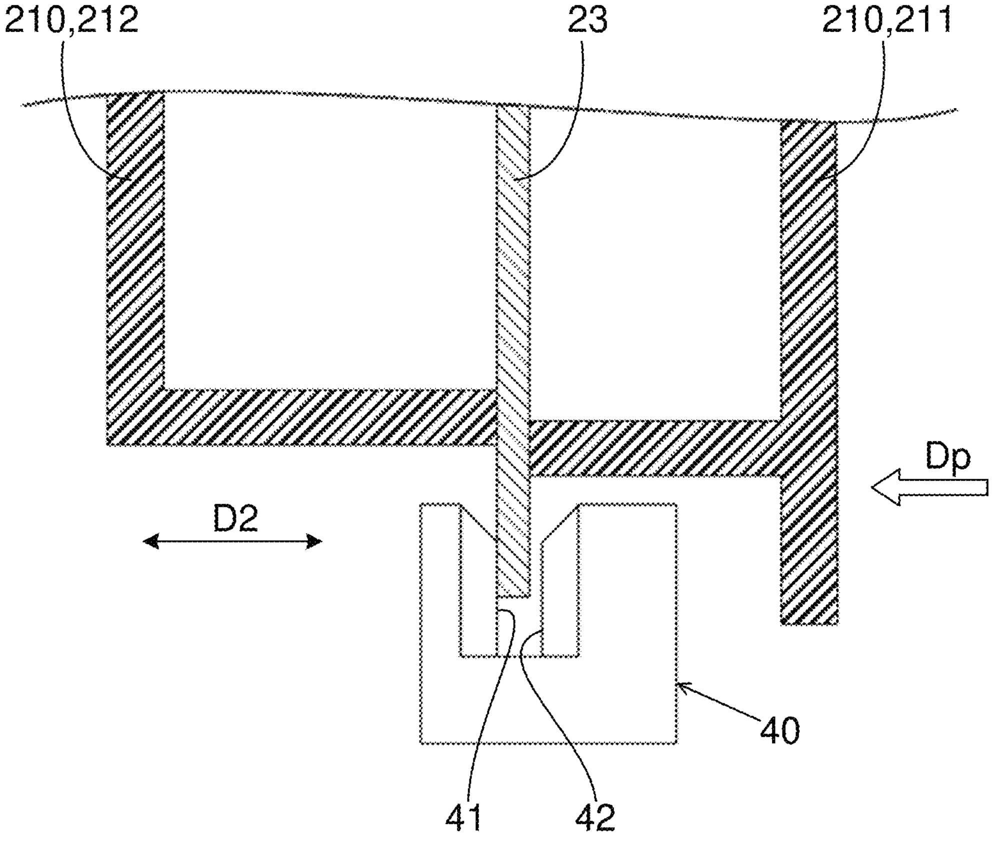
FIG. 15 is a schematic view showing a positional relationship between the restriction member and a restriction plate in the image forming apparatus according to the embodiment.

As shown in FIGS. 13 to 15, the image forming apparatus 100 includes restriction members 40. The restriction members 40 are arranged on the one side of the fitting region 100A in the second direction D2 (the lower left of the fitting region 100A). The restriction members 40 are supported by the main body frame 1 to be arranged in the fitting region 100A. In other words, the main body frame 1 includes the restriction members 40 fitted to the fitting region 100A.

In the state where the process unit 2 is fitted into the fitting region 100A, the restriction members 40 are arranged below the process unit 2. The restriction members 40 restrict the displacement of the process unit 2 fitted into the fitting region 100A in the second direction D2.

In order to restrict the displacement of the process unit 2 with the restriction members 40, a restriction plate 23 is provided in the process unit 2. The process unit 2 includes, as the restriction plate 23, a member made of sheet metal (metal plate on which various types of processing are performed). The restriction plate 23 protrudes downward from the unit frame 21 with the second direction D2 being the direction of thickness of the plate. The restriction plate 23 is supported by the unit side plate 210 (left side plate).

The unit side plate 210 includes an inner plate 211 and an outer plate 212. The inner plate 211 forms the inner surface of the unit side plate substrate 210, and the outer plate 212 forms the outer surface of the unit side plate substrate 210. The inner plate 211 and the outer plate 212 are assembled to each other in the second direction D2, and thus the unit side plate 210 is obtained. The restriction plate 23 is sandwiched between the inner plate 211 and the outer plate 212 in the second direction D2.

Although not shown in the figure, the inner plate 211 includes a locating portion for locating various types of constituent elements (such as the photosensitive drum 111 and the development cartridge 200) of the process unit 2. The outer plate 212 supports a drive system for driving various types of constituent elements (such as the photosensitive drum 111 and the development cartridge 200) of the process unit 2. The outer plate 212 covers the drive system from outside in the second direction D2.

When viewed in the first direction D1, the restriction member 40 is a U-shaped member with an upper portion being open. In other words, the restriction member 40 is a member which is recessed downward from above and penetrates in the first direction D1.

The restriction member 40 includes a pair of sandwiching surfaces 41 and 42 which are spaced opposite each other in the second direction D2. The sandwiching surface 41 on one side is located on the one side in the second direction D2, and the sandwiching surface 42 on the other side is located on the other side in the second direction D2. In other words, the sandwiching surface 41 on the one side is a surface which faces to the other side in the second direction D2, and the sandwiching surface 42 on the other side is a surface which faces to the one side in the second direction D2. In the state where the process unit 2 is fitted into the fitting region 100A, the pair of sandwiching surfaces 41 and 42 sandwich the restriction plate 23 in the second direction D2.

The process unit 2 is properly fitted into the fitting region 100A, and thus the restriction plate 23 is arranged between the pair of sandwiching surfaces 41 and 42 in the second direction D2. Hence, when the process unit 2 is fitted into the fitting region 100A, an operation of pressing the process unit 2 into the fitting region 100A while aligning the positions of the restriction plate 23 and the restriction members 40 in the second direction D2 is performed. Here, when viewed in the direction of the operation performed by an operator (viewed from the front of the image forming apparatus 100), the restriction member 40 is U-shaped, and thus it is easy to locate the restriction plate 23 and the restriction members 40 in the second direction D2.

In the state where the process unit 2 is fitted into the fitting region 100A, the process unit 2 is pressed by the main body side contacts 10 to the one side in the second direction D2. In other words, in a state where the restriction plate 23 is sandwiched between the pair of sandwiching surfaces 41 and 42 in the second direction D2, the process unit 2 is pressed by the main body side contacts 10 to the one side in the second direction D2.

Here, the restriction plate 23 abuts against the sandwiching surface 41 located on the one side in the second direction D2 (see FIG. 15). In FIG. 15, the direction of pressing against the process unit 2 performed by the main body side contacts 10 serving as the pressing member is indicated by a white arrow and is identified with a symbol Dp.

The restriction plate 23 abuts against the sandwiching surface 41 located on the one side in the second direction D2, and thus the restriction plate 23 is not displaced any further to the one side in the second direction D2. In this way, the movement of the process unit 2 to the one side in the second direction D2 is restricted. The process unit 2 is pressed by the main body side contacts 10 to the one side in the second direction D2, and thus the movement of the process unit 2 to the other side in the second direction D2 is also restricted. Consequently, in the state where the process unit 2 is fitted into the fitting region 100A, the displacement of the process unit 2 in the second direction D2 is restricted.

In the present embodiment, the restriction members 40 are provided in the main body (that is, the main body frame 1) of the image forming apparatus 100, the restriction plate 23 is provided in the process unit 2 and thus when the process unit 2 is fitted into the fitting region 100A, it is possible to accurately locate the process unit 2 in the second direction D2 relative to the main body (that is, the main body frame 1) of the image forming apparatus 100. Since main components such as the photosensitive drum 111 which significantly affect print quality are constituent elements of the process unit 2, the process unit 2 is accurately located in the second direction D2, with the result that it is possible to suppress a decrease in the print image.

In the present embodiment, since the process unit 2 fitted into the fitting region 100A is constantly pressed toward the one side in the second direction D2, a member against which a part of the process unit 2 abuts is provided on the one side of the process unit 2 in the second direction D2, and thus the process unit 2 is located in the second direction D2. Specifically, in the state where the process unit 2 is fitted into the fitting region 100A, the restriction plate 23 is sandwiched between the pair of sandwiching surfaces 41 and 42 in the second direction D2.

Consequently, in the present embodiment, it is possible to easily locate the process unit 2 in the second direction D2. The main body side contacts 10 are used as the pressing member, and thus it is not necessary to separately install the pressing member. In this way, it is possible to suppress the complication and upsizing of the structure.

In the present embodiment, a plurality of restriction members 40 are arranged in the fitting region 100A. Specifically, the restriction member 40 is arranged on each of the one side and the other side in the first direction D1 relative to the center position of the fitting region 100A in the first direction D1. In this configuration, the process unit 2 is fitted into the fitting region 100A, and thus the restriction member 40 is arranged on each of the one side and the other side in the first direction D1 relative to the center position of the process unit 2 in the first direction D1. The restriction plate 23 abuts against the restriction member 40 on each of the one side and the other side in the first direction D1. In this way, the process unit 2 is located on the one side and the other side in the first direction D1, and thus it is possible to accurately locate the process unit 2.

In the present embodiment, the restriction members 40 are arranged adjacent to the guide surface 31 in the second direction D2. When the process unit 2 is fitted into the fitting region 100A, the process unit 2 is moved to the other side in the first direction D1 such that the roller 22 travels on the guide surface 31, and thus the restriction plate 23 is guided between the pair of sandwiching surfaces 41 and 42 in the second direction D2. In other words, when the process unit 2 is fitted into the fitting region 100A, the process unit 2 is moved along the guide surface 31 to the other side in the first direction D1, and thus the restriction plate 23 is arranged between the pair of sandwiching surfaces 41 and 42 in the second direction D2. In this way, it is possible to easily arrange the restriction plate 23 between the pair of sandwiching surfaces 41 and 42 in the second direction D2.

Figure 16:
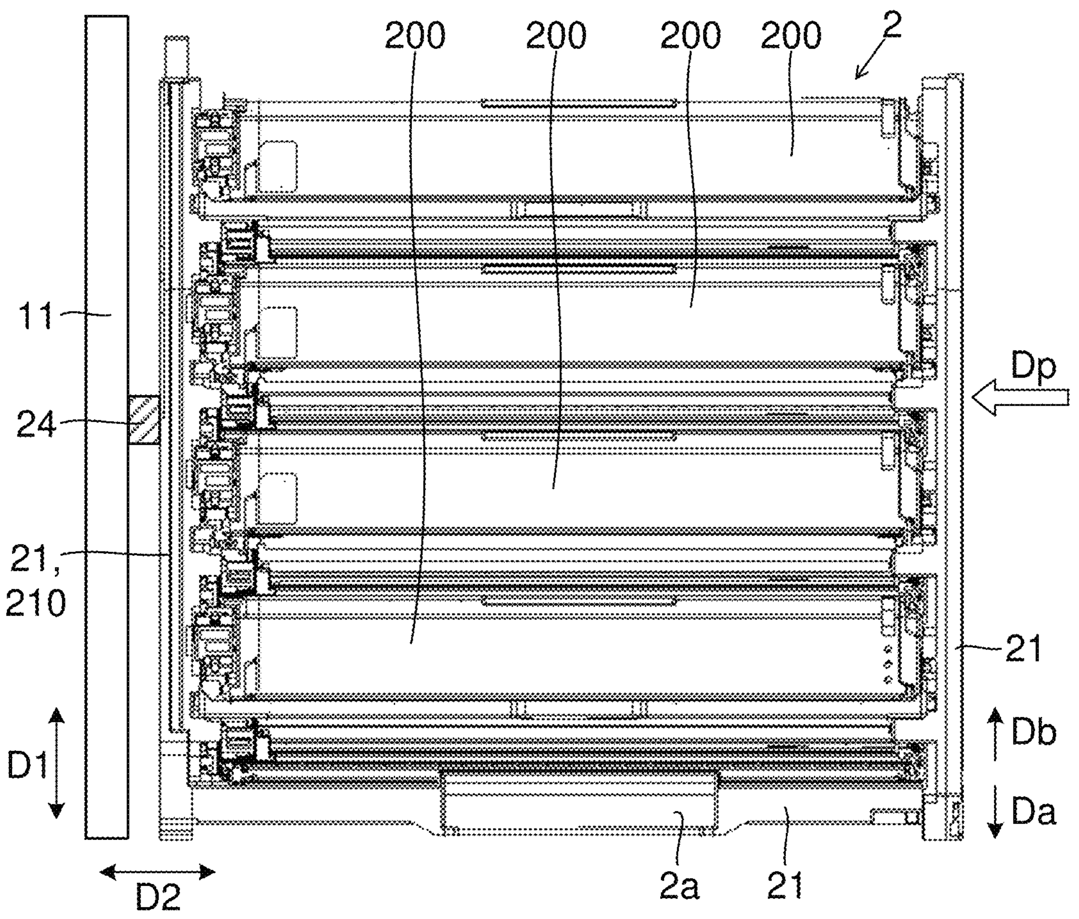
FIG. 16 is a plan view when the process unit in the image forming apparatus according to the embodiment and an area therearound are viewed from above.

In the present embodiment, in addition to the locating of the restriction plate 23 and the restriction members 40, another part is also located. A specific description will be given below with reference to FIGS. 16 and 17. In FIG. 16, the direction of pressing against the process unit 2 performed by the main body side contacts 10 serving as the pressing member is indicated by the white arrow and is identified with the symbol Dp.

The main body frame 1 includes a main body side plate 11 which is arranged on the one side (that is, the left side) of the fitting region 100A in the second direction D2. The main body side plate 11 covers the fitting region 100A from the one side in the second direction D2. In the state where the process unit 2 is fitted into the fitting region 100A, the main body side plate 11 and the unit side plate 210 are opposite each other in the second direction D2.

Figure 17:
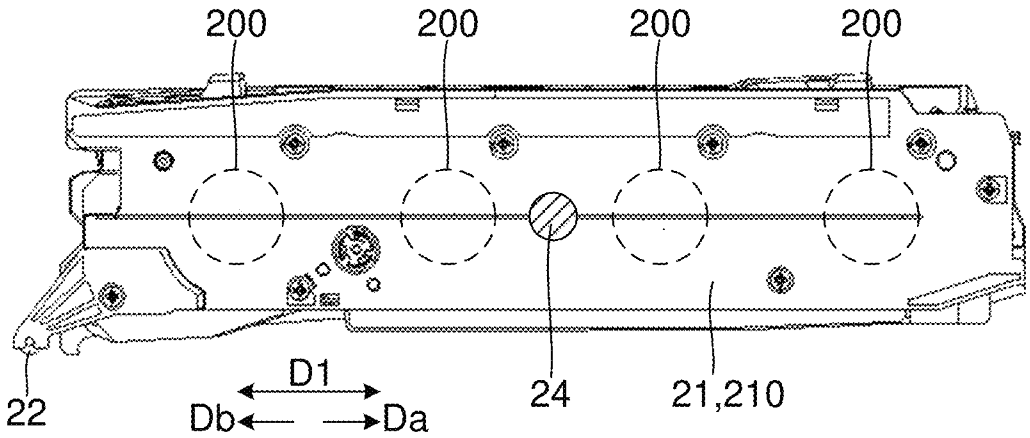
FIG. 17 is a side view (diagram showing the arrangement position of an abutment portion) when the process unit in the image forming apparatus according to the embodiment is viewed from one side in the second direction.

The unit side plate 210 includes an abutment portion 24 which protrudes to the one side in the second direction D2. The abutment portion 24 is integrally formed in the unit side plate 210 (specifically, the outer plate 212). Since the unit side plate 210 is made of resin, the abutment portion 24 is made of resin. In FIGS. 16 and 17, for clarification of the abutment portion 24, the abutment portion 24 is hatched.

In the state where the process unit 2 is fitted into the fitting region 100A, the abutment portion 24 protrudes toward the main body side plate 11. Here, in the state where the process unit 2 is fitted into the fitting region 100A, the process unit 2 is pressed by the main body side contacts 10 to the one side in the second direction D2. In this way, the abutment portion 24 abuts against the main body side plate 11, and thus the movement of the process unit 2 to the one side in the second direction D2 is restricted. In other words, the displacement of the process unit 2 in the second direction D2 is restricted. In this way, it is possible to more accurately locate the process unit 2 in the second direction D2 relative to the main body frame 1.

Here, in the present embodiment, the restriction plate 23 protrudes downward from the unit frame 21, abuts against the restriction members 40 arranged below the unit frame 21 and thereby locates the process unit 2 in the second direction D2. On the other hand, the abutment portion 24 is arranged higher than parts of the restriction plate 23 which abut against the restriction members 40. In other words, the position of the abutment portion 24 in the up/down direction is located higher than the positions of the parts of the restriction plate 23 which abut against the restriction members 40. For example, the abutment portion 24 is arranged substantially in a center portion of the unit side plate 210 in the up/down direction. In this way, in the state where the process unit 2 is fitted into the fitting region 100A, even when the process unit 2 is pressed by the main body side contacts 10, it is possible to suppress the inclination of the process unit 2 relative to the up/down direction.

In the present embodiment, the abutment portion 24 is arranged substantially in a center portion of the unit side plate 210 in the first direction D1. For example, the abutment portion 24 is arranged between the two development cartridges 200 in the center of the four development cartridges 200 in the first direction D1 when viewed in the second direction D2 (see FIG. 17). In this way, in the state where the process unit 2 is fitted into the fitting region 100A, even when the process unit 2 is pressed by the main body side contacts 10, it is possible to suppress the inclination of the process unit 2 relative to the first direction D1. In FIG. 17, for convenience, the arrangement positions of the development cartridges 200 are indicated by dotted lines.

It should be considered that the embodiment disclosed herein is illustrative in all respects and not restrictive. The scope of the present disclosure is indicated not by the description of the above embodiment but by the scope of claims, and furthermore, meanings equivalent to the scope of claims and all changes within the scope are included therein.

What is claimed is:

1. An image forming apparatus comprising:

a main body frame that includes a fitting region;

a process unit that is removably fitted into the fitting region in a first direction orthogonal to an up/down direction and performs a development process which develops an electrostatic latent image into a toner image;

a pressing member that presses the process unit fitted into the fitting region toward one side in a second direction horizontally orthogonal to the first direction; and a restriction member that is arranged in the fitting region to restrict a displacement of the process unit fitted into the fitting region in the second direction, wherein the process unit includes a unit frame and a restriction plate that is arranged on the unit frame and protrudes downward from the unit frame with the second direction being a direction of thickness thereof, the restriction member includes a pair of sandwiching surfaces that sandwich the restriction plate in the second direction and the process unit is fitted into the fitting region, and the process unit is pressed by the pressing member to the one side in the second direction such that the restriction plate abuts against the sandwiching surface which is included in the pair of sandwiching surfaces and is located on the one side in the second direction to restrict a displacement of the process unit in the second direction.

2. The image forming apparatus according to claim 1, wherein the restriction member is arranged on each of one side and an other side in the first direction relative to a center position of the fitting region in the first direction, and the restriction plate abuts against the restriction member on each of the one side and the other side in the first direction.

3. The image forming apparatus according to claim 1, wherein the main body frame includes a main body side plate that covers the fitting region from the one side in the second direction, the unit frame includes a unit side plate that is opposite the main body side plate in the second direction, the unit side plate includes an abutment portion that protrudes toward the main body side plate and the process unit is pressed by the pressing member to the one side in the second direction such that the abutment portion abuts against the main body side plate to restrict the displacement of the process unit in the second direction.

4. The image forming apparatus according to claim 3, wherein a position of the abutment portion in the up/down direction is located higher than a position of a part of the restriction plate in the up/down direction that abuts against the restriction member.

5. The image forming apparatus according to claim 3, wherein the process unit includes four development cartridges that are fitted into the unit frame, individually store toners for the development process and are arranged in the first direction, and the abutment portion is arranged between the two development cartridges in a center of the four development cartridges in the first direction when viewed in the second direction.

6. The image forming apparatus according to claim 1, further comprising:

a guide member that guides fitting and removal of the process unit with respect to the fitting region, wherein the guide member includes a guide surface that extends in the first direction, the process unit is fitted and removed with respect to the fitting region by being moved along the guide surface in the first direction, the restriction member is arranged adjacent to the guide surface in the second direction and when the process unit is fitted into the fitting region, the process unit is moved along the guide surface to an another side opposite to one side in the first direction such that the restriction plate is arranged between the pair of sandwiching surfaces in the second direction.

7. The image forming apparatus according to claim 1, wherein the image forming apparatus includes, as the pressing member, a main body side contact that is arranged in the main body frame, protrudes to the one side in the second direction toward the fitting region and is in contact with the process unit in a state where the process unit is fitted into the fitting region to be electrically connected to the process unit, the main body side contact is a torsion coil spring which includes a wound spring portion and a pair of arm portions extending tangentially from both ends of the wound spring portion and in which the up/down direction is an axial direction of the wound spring portion, one of the arm portions of the torsion coil spring protrudes to the fitting region such that the main body side contact can be brought into contact with the process unit and in the state where the process unit is fitted into the fitting region, the one of the arm portions is in contact with the process unit, and the main body side contact is deformed in a torsional direction of the torsion coil spring such that the process unit is pressed by the main body side contact to the one side in the second direction.

* * * * *